United States Patent [19]

Zuckerman

[11] 4,410,270
[45] Oct. 18, 1983

[54] ANGLE POSITION TRANSDUCER

[75] Inventor: Leonard Zuckerman, Dix Hills, N.Y.

[73] Assignee: Litton Systems, Inc., Hauppauge, N.Y.

[21] Appl. No.: 255,589

[22] Filed: Apr. 20, 1981

[51] Int. Cl.³ .................... G01B 11/26; H04N 1/04
[52] U.S. Cl. .................................. 356/152; 356/141; 358/206; 358/285
[58] Field of Search .................. 356/1, 4, 141, 152; 358/286, 285, 206

[56] References Cited

U.S. PATENT DOCUMENTS

| | | | |
|---|---|---|---|
| 3,533,699 | 10/1970 | Hopkins et al. | 356/152 |
| 3,617,131 | 11/1971 | Taguchi | 356/152 |
| 3,671,126 | 6/1972 | Erb | 356/1 |
| 3,963,352 | 6/1976 | Rishoud et al. | 356/155 |
| 4,159,169 | 6/1979 | Sato | 354/31 F |

Primary Examiner—S. C. Buczinski
Attorney, Agent, or Firm—Robert F. Rotella; Michael H. Wallach

[57] ABSTRACT

An angle position transducer is shown which is utilized within an optical scanning system that projects a rotating beam of light from a single point and reflects that light from a radial reflector back toward the point. The transducer includes a wedge shaped mask which is arranged between a pair of photodetectors mounted to the left and right of the mask. A second mask limits the amount of light which lands upon the photodetectors during the extreme left or right-hand rotation of the light beam. The output of the photodetectors is combined in an add and subtract circuit to produce a linear output signal which indicates the position of the rotating light beam from its far right to its far left-hand rotational position.

6 Claims, 9 Drawing Figures

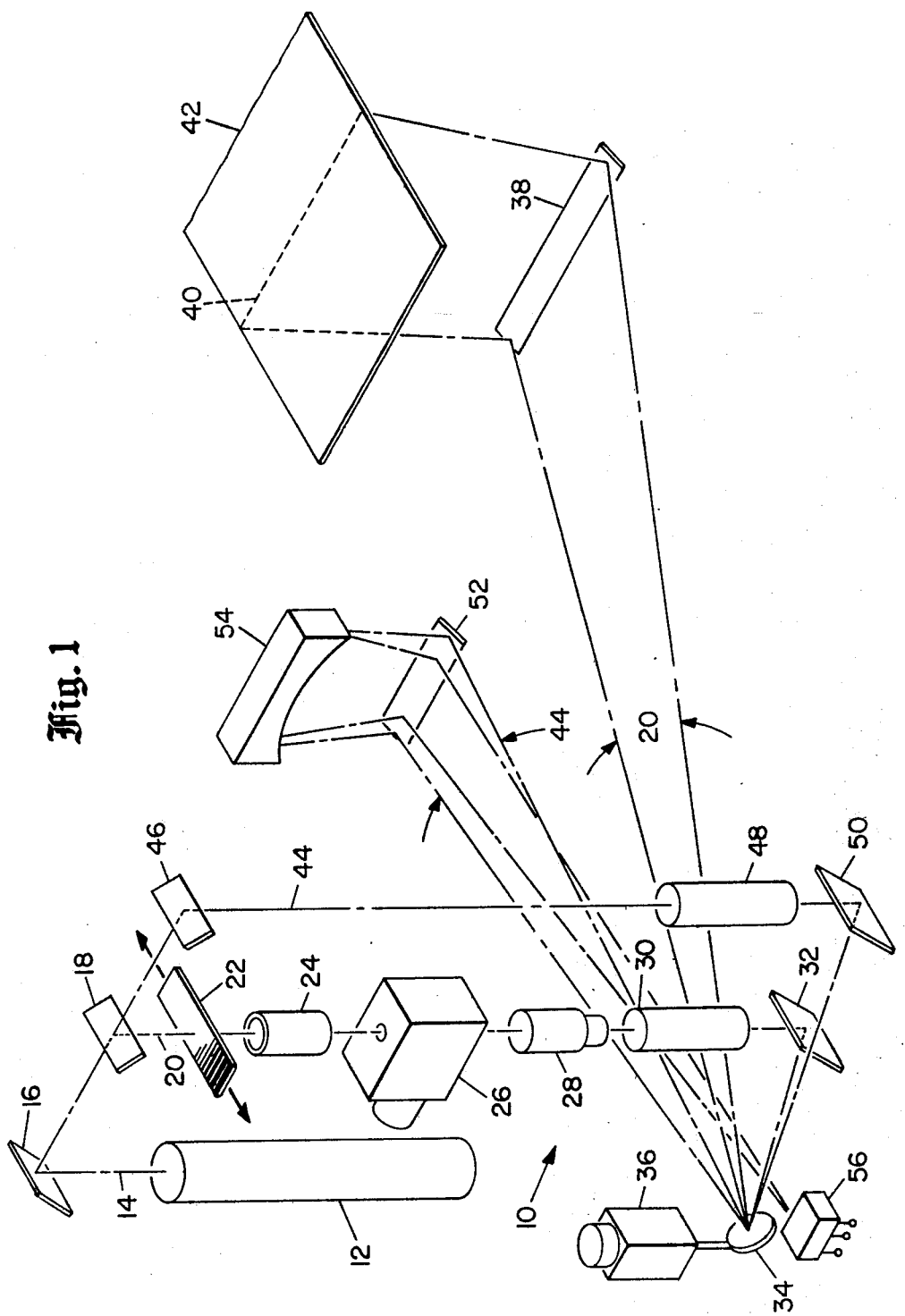

ANGLE POSITION TRANSDUCER

The present invention relates to an angle position transducer and, more particularly, to a transducer which incorporates a pair of photodetectors and a mask to indicate the angular position of a rotating light beam.

BACKGROUND OF THE INVENTION

In a system that electromechanically scans a light beam over a document, such as an optical scanning, reading and recording system used, for example, in a facsimile reader or printer, accurate control of the scanning device is essential.

Many low cost, high speed systems use a galvanometer scanner. The performance of a high speed galvanometer scanner is very sensitive to temperature variations, performance history, load, inertia and other factors. As a result, it is often necessary to incorporate the galvanometer in a closed loop feedback system.

Several methods have been attempted to provide a relatively accurate feedback signal for the galvanometer. One method involves sensing galvanometer position by measuring variable capacitance formed between a moving plate fixed to a galvanometer shaft and a fixed plate attached to the galvanometer frame. This method adds inertia to the galvanometer thus limiting the galvanometer's ultimate scanning frequency. An example of a galvanometer utilizing a capacitance in the stator structure of the scanner is discussed in a paper entitled Applications of Galvanometers to Laser Scanning by Pierre J. Brosens and Edward P. Grenda, presented at the Eighteenth Annual Technical Meeting, Society of Photo-Optical Instrumentation Engineers, Aug. 19–23, 1974, at San Diego, Calif.

Another method for sensing the shaft position of a galvanometer includes the use of the shaft angular velocity to recover the back EMF from the galvanometer winding by subtracting the various other electrical components comprising the galvanometer's voltage. A third method utilizes separate windings to recover the back EMF which is proportional to the galvanometer velocity. Each of the above methods have been demonstrated to contain excessive drift with temperature and excessive instability as a function of galvanometer environmental history.

SUMMARY OF THE INVENTION

Accordingly, it is an object of the present invention to provide an improved angle position transducer which will accurately indicate the position of a rotating light beam free from distortions caused by temperature, past performance history, or load inertia.

It is another object of the present invention to provide a unique circuit which may be used in combination with the angle position transducer to produce an output signal that indicates the position of the light beam and transmits additional information read by the scanning light beam.

In accomplishing these and other objects, there is provided a scanner which reflects a light beam from a single point toward a cylindrical reflector such as that described in a copending patent application entitled Grating Clock Assembly for Optical Scanning System, by John F. Tregay, Ser. No. 245,813, filed Mar. 20, 1981, and assigned to the same assignee as the present invention.

As the light beam is reflected from the cylindrical reflector, it is directed back toward or near the point where its original rotation motion was generated. At this point, there is mounted an angle position transducer which includes a pair of photodetectors mounted on either side of the point of rotation. Mounted between the detectors is a wedge shaped mask which shields each detector from the other. The mask further includes a second mask which limits the amount of reflected light that may fall upon the detectors from the extreme right or left-hand side of the light beam rotation as that beam is reflected from the curved surface of the cylindrical reflector.

The signals generated by the detectors are applied to an adding and subtracting circuit which generates an S-curve signal for indicating the angular position of the rotating light beam. Further circuitry is utilized to generate a second signal that is combined with the first mentioned angular signal to cancel components from the first signal including components relating to the temperature and the light level of the beam which strikes the photodetector. This circuitry makes the transducer independent of the temperature and the levels of light within the beam.

DESCRIPTION OF THE DRAWINGS

For a better understanding of invention summarized above and of the objects and advantages presented thereby, the reader's attention is directed to the following specification and accompanying drawings wherein:

FIG. 1 is an exploded view showing an optical scanning system in which the angle position transducer of the present invention may be utilized;

DESCRIPTION OF THE PREFERRED EMBODIMENT

Figure 2A:
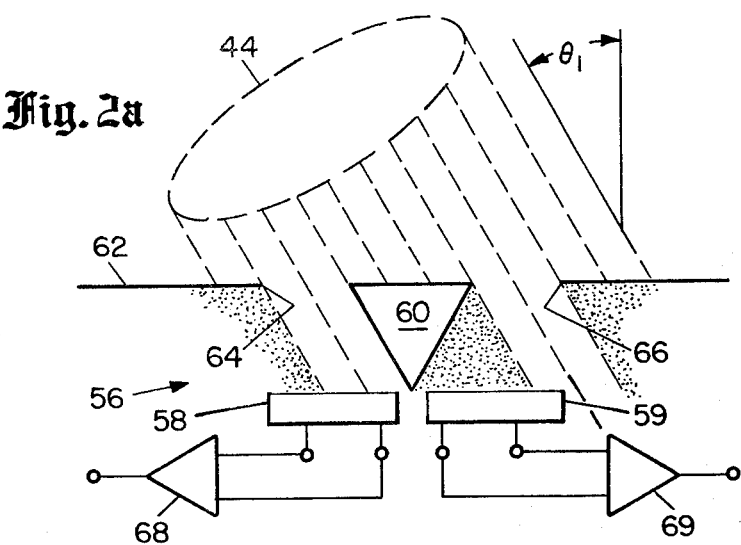
FIGS. 2a, 2b and 2c are diagrams showing the angle position transducer with a beam of light striking it from various angles.

Referring now to the drawings, FIG. 1 shows an optical scanning system 10 including a source of electromagnetic energy such as the laser 12 whose beam 14 is directed toward a first reflective mirror 16 and reflected toward a second beam splitting mirror 18. The beam splitting mirror 18 permits a percentage of the light from beam 14 to pass directly therethrough while reflecting the remaining portion of that light away from the beam 14 and into a first beam path 20. The first beam path 20 is then passed through a variable density optical wedge 22 and a beam compressor 24 prior to being directed through an acousto-optic modulator 26. When the modulator is energized, the beam 20 is offset by an amount determined by the frequency applied to the acousto-optic modulator for generating a first order beam that is then passed through a field lens and aperature 28. The beam 20 is then focused by an objective lens 30 upon a third mirror 32 which reflects the beam toward a galvanometer mirror 34 of a galvanometer 36.

As the coil of the galvanometer, not shown, is offset by a signal applied across the terminals of the galvanometer 36, the coil rotates thereby rotating mirror 34 through an angle $\theta$ causing the beam 20 to be rotated about a point established by the galvanometer. Beam 20 is swept through an angle $2\theta$ across a long beam folding mirror 38 which, in turn, reflects the beam upon a scanning line 40 on a document surface 42.

The original beam 14 which passed through the beam splitter 18 forms a second beam 44 that is reflected by a mirror 46 through an objective lens 48 upon a reflective mirror 50. The beam 44 is then reflected upon the galvanometer mirror 34 and, due to its greater angle, reflected therefrom toward a second short beam folding mirror 52. The beam 44 is then reflected from the mirror 52 upon a curved surface of a cylindrical reflector 54.

As the reflector 54 is tipped slightly in one direction or the other, the beam 44 which strikes its radially curved surface is reflected back upon the reflective surface of mirror 52 and into a beam path that is slightly offset either above or below the galvanometer 36. In the embodiment shown, this path is below the galvanometer 36 where the beam falls upon an angle position transducer 56.

It will be seen, after review of the foregoing figure, that the rotation of the galvanometer mirror 34 causes first and second beams to be displaced across the folded mirrors 38 and 52, respectively. The first beam 20 is then reflected upon a document 42 where it may record or read information including alphanumeric characters or graphics. As the mirror 34 rotates, it also displaces the second beam 44 across the folded mirror 52. This beam then strikes the curved surface of reflector 54 and is reflected back toward a common point regardless of the position of mirror 34 due to the radius of mirror 54. Located at the point of reflection, is the angle position transducer 56. As the beam 44 sweeps across the curved surface of reflector 54 it is interrupted by a grating, not shown. Thus, the transducer 56 receives an interrupted signal which indicates the location of the first sweeping beam 20 across the document 42.

The foregoing system utilizing the curved reflector 54 has been more fully described in the copending patent application by John F. Tregay identified hereinabove. The angle position transducer 56 of the present invention is designed for use within an optical scanning system such as that described in the Tregay application. That is, the transducer 56 functions to indicate the angular position of the light beam 44 which strikes its surface at varying angles caused by the rotation of the galvanometer mirror 34.

Figure 2B:
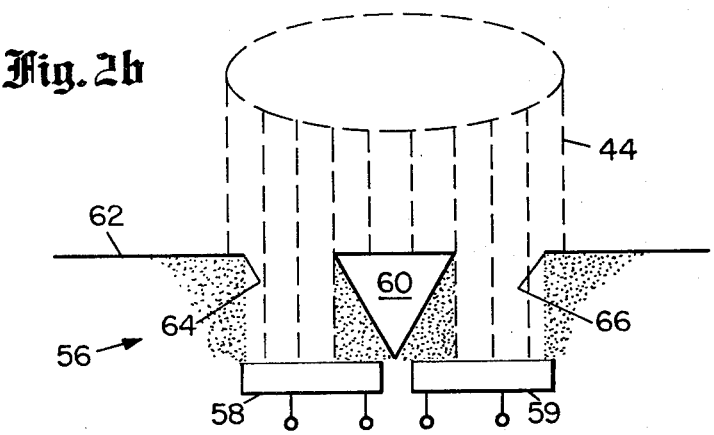
Figure 2C:
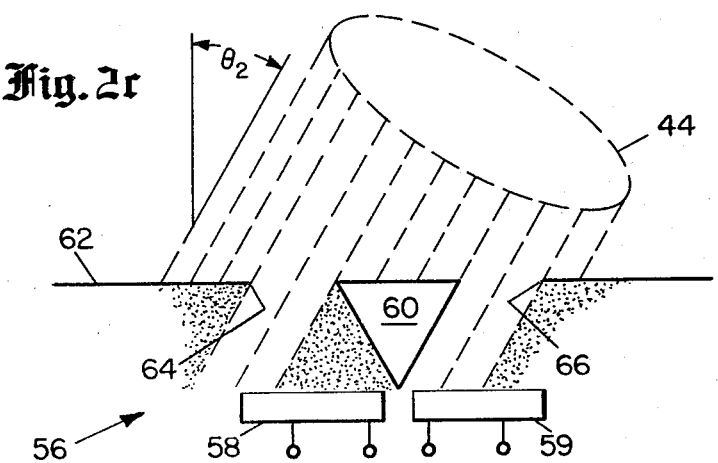

These angles vary from an extreme left-hand position to an extreme right-hand position, as best illustrated in FIGS. 2a and 2c, respectively. As mentioned above, the displacement $\theta$ causes the beam 44 to be displaced through an angle of $2\theta$. As the beam sweeps from the left-hand side of the reflector 54 toward the right-hand side, it is reflected back toward the angle position transducer 56 to strike the surface thereof at an angle $\theta_1$, from the left-hand side, FIG. 2a. The sweeping beam continues across the reflector 54 to a normal position where its reflected beam strikes the transducer 56 at a perpendicular angle to its surface, FIG. 2b. As the beam continues, its reflected light strikes the transducer 56 from the right-hand side at an angle of $\theta_2$, FIG. 2c.

As seen in FIGS. 2a–c, the angle position transducer 56 includes a pair of photodetectors 58 and 59 which may be light sensitive diodes. The detectors 58 and 59 are respectively mounted on the left and right-hand side of a wedge shaped mask 60 which is mounted directly between the detectors 58 and 59 the reflector 54. The division between the two detectors 58 and 59 is generally located at the point of rotation of the galvanometer mirror 34 and offset along the axis formed by the center of the galvanometer 36 by a distance determined by the tilt of reflector 54. The point or narrowest section of the wedge mask 60 is generally aligned with the separation of the two photodetectors. The widest portion of the mask 60 is arranged between the transducer 56 and reflector 54.

A second mask 62 is aligned with the broadest surface of the mask 60 to form left and right-hand apertures 64 and 66. These apertures are generally aligned in front of the photodetectors 58 and 59. As seen in FIGS. 2a–2c, the angle position transducer 56 of the present invention may be constructed in a semiconductor chip to include a pair of amplifiers 68 and 69 which are connected to receive an output signal generated when the electromagnetic energy from light beam 44 lands upon the surfaces of the photodetectors 58 and 59, respectively.

In operation, the angle position transducer 56 receives the electromagnetic energy of the beam 44 which lands on either or both of the left and right-hand photodetectors 58. As seen in FIG. 2a, the left-hand photodetector 58 is illuminated depending upon the size of the aperture 64. If, for example, the aperture 64 were equal in size to the left-hand photodetector 58, the detector would be fully illuminated at one particular angle. As the beam 44 moves further to the left, the left most edge of the aperture 64 will cast its shadow over the left-hand photodetector 58 and eventually obscure the detector from the light beam. As the beam begins to move to the right, the photodetector 58 will become further exposed as mentioned above.

Continuing its rotation to the right, the light beam 44 will eventually align itself perpendicularly to surface of the angle position transducer 56, FIG. 2b. In this position, the left and right-hand photodetectors 58 and 59 are partially exposed to the light beam 44 due to the wedge shaped mask 60. Further rotation of the light beam to the right will eventually expose the right-hand photodetector 59 to the full magnitude of the light beam 44 while the left-hand photodetector 58 is more and more obscured, FIG. 2c.

Figure 4A:
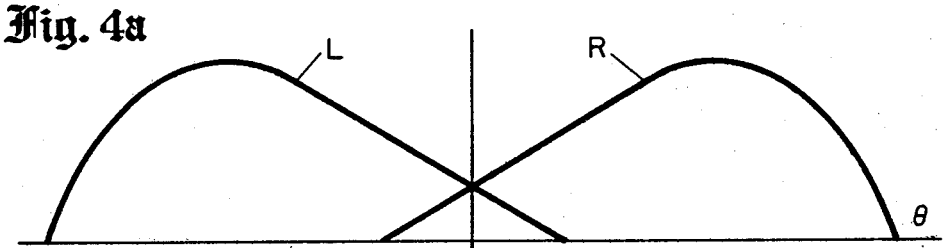
FIGS. 4a and 4b are curves useful in explaining the operation of the present invention.

The output signals thus generated by the photodetectors 58 and 59 is amplified by the amplifiers 68 and 69 and appears as shown in FIG. 4a as a pair of curves L and R. It should be noted that the output L of the left-hand photodetector 58 rises sharply and then falls off gradually to a zero output. In a similar manner the output R of the right-hand photodetector 59 rises less sharply and falls off rapidly as the beams moves from the left to right-hand side of the reflector 54.

Figure 3:
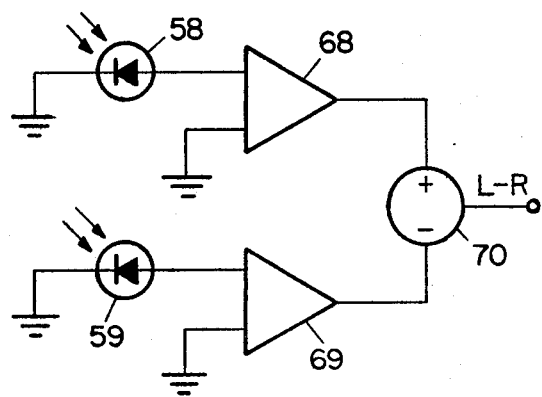
FIG. 3 is a schematic diagram showing the electrical connection of the photodetectors which form part of the angle position transducers.
Figure 4B:
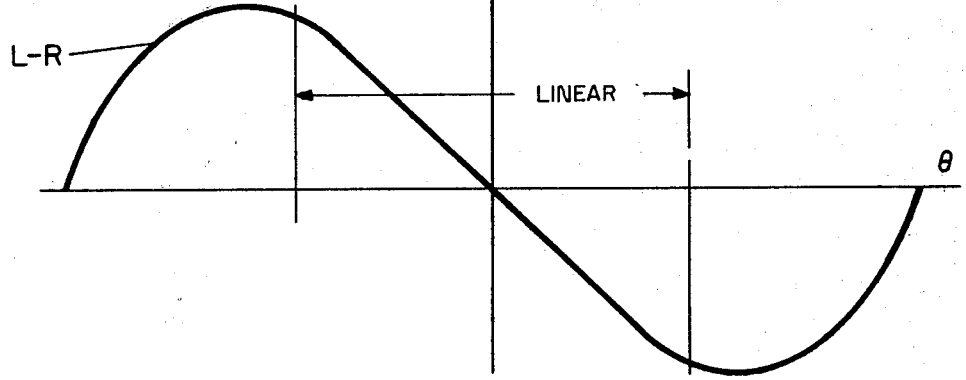

As seen in FIG. 3, the outputs of the photodetectors 58 and 59 are applied to the input terminals of amplifiers 68 and 69 and then to an adding and subtracting circuit 70. The output L-R of the adding and subtracting circuit 70 is plotted in FIG. 4b. It will be noticed that by subtracting the value of the signal R generated by the right-hand photodetectors 59 from the value L of the left-hand photodetector 58 a generally linear function is generated over a substantial portion of the rotation of the light beam 44. Further, the curve crosses the x-axis at the point where the light beam is perpendicular to the angle position transducer 56. The circuit thus described generates a useful angle information signal which indicates the angle of light beam 44.

Figure 5:
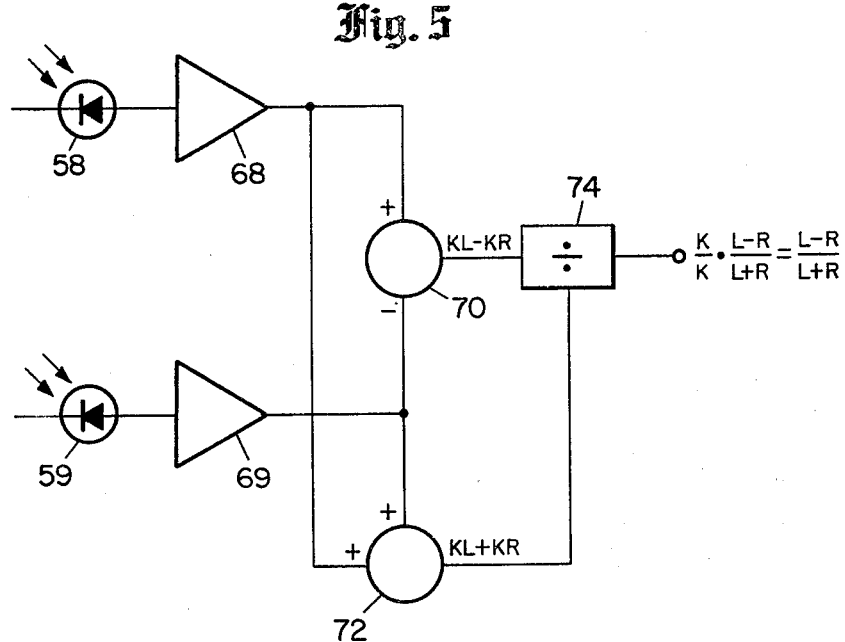
FIG. 5 is a schematic diagram showing a circuit which eliminates variations caused by temperature of fluctuations in light intensity.

Referring now to FIG. 5, a circuit similar to the circuit shown in FIG. 3 is shown with the addition of an adding circuit 72. The adding circuit 72 is connected to receive the outputs of amplifiers 68 and 69 so that the signal L from the left-hand photodetector 58 is added to the signal R from the right-hand photodetector 59, L+R. It should be noted that the outputs L−R and L+R include a variable K which is dependent upon the gain of the photodetectors 58 and 59 and the amplifiers 68 and 69 and which vary with temperature. Further, the variable K is susceptible to change due to the intensity of the light beam 44. Thus, the output from the adding and subtracting circuit 70 becomes KL−KR. Similarly, the output of the adding circuit 72 becomes KL+KR. When the useful angle information signal KL−KR is applied to a divider 74 along with the light beam information signal KL+KR, the output quotient is the division of one signal value by the other. It will be understood that the variable K may be factored from the numerator and denominator and cancelled. Thus, by utilizing the divider circuit 74, the output signal from the angle position transducer is normalized to eliminate variations caused by changes in temperature or changes in the intensity of the light beam 44.

Figure 6:
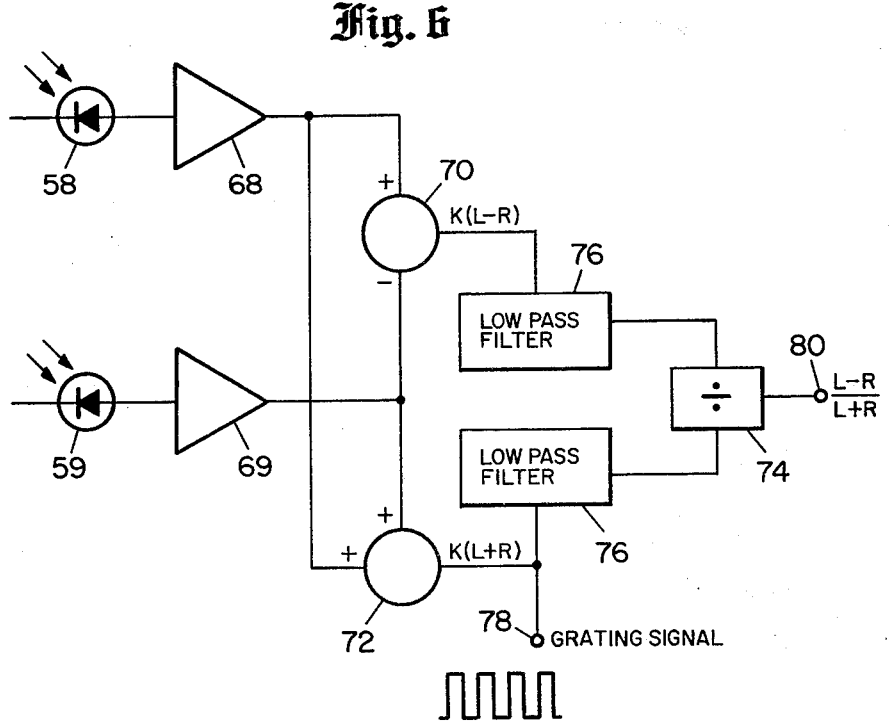
FIG. 6 is a circuit, similar to FIG. 5, showing a further embodiment of the present invention.

Referring now to FIG. 6, the circuit similar to that shown in FIG. 5 is shown with the addition of two low pass filters 76 connected between the adding and subtracting circuit 70 and the divider 74 and between the adding circuit 72 and divider 74. It will be remembered that the left and right-hand signal applied to the photodetectors 58 and 59, respectively, includes a varying signal in the form of a square wave generated by the rotation of the light beam 44 across the cylindrical reflector 54. This square wave is caused by the interruption of the grating, not shown, mounted upon the surface of the cylindrical reflector 54. As seen in FIG. 6, the output of adding circuit 72 includes the square wave generated by the left-hand detector 58 and the right-hand detector 59. This additional information signal, shown at terminal 78, may be utilized wherein an optical scanner, for example, to indicate the location of the scanning beam upon the document 42. This grating signal is filtered by the low pass filters 76 so that it is not applied to the divider 74. However, the lower frequency signal generated by the photodetectors due to the changing angular position of the beam 44 is transmitted through the filters to the divider 74 and applied at an output terminal 80 as a useful angle position indicating signal. As stated above, this signal is linear over a substantial portion of the rotation of the beam 44 across the reflected surface 54. It will also be noted that the positive outputs L and R of amplifier 68 and 69 are retained at the output of the adding circuit 72 so that there is always sufficient signal to generate the square wave required at terminal 68 to produce a grating circuit.

While the present invention has been described for use within an optical scanning system, it will be apparent to those skilled in the art that the angle position transducer may be utilized in any system in which the light beam is rotated about a single point and is reflected toward that point or within a reasonably close proximity thereto. Accordingly, the present invention should be limited only by the appended claims.

I claim:

1. An angle position transducer for indicating the position of a light beam as that beam rotates in a locus from left to right and right to left about a point and is reflected back toward the said point, comprising:
   photodetector means for indicating the degree of angular position of said light beam at any point of said locus;
   said photodetector means being disposed to the right and left sides of said point;
   masking means mounted between said point and said reflected light beam to mask said light beam from said right side mounted photodetector when said light beam is reflected from said left side and to mask said light beam from said left side mounted photodetector when said light beam is reflected from said right side; and
   second masking means mounted on either side of said first mentioned masking means;
   said first mentioned masking means being formed with a wedge shape having the narrowest point thereof mounted between said right and left side mounted photodetector and having the widest point thereof mounted toward said reflected light beam to prevent light scattering between said photodetectors; whereby, an output signal from said photodetector means indicates the position of said light beam.

2. An angle position transducer, as claimed in claim 1, wherein:
   said second masking means is formed with two apertures on each side of said first mentioned masking means to permit a limited amount of said light beam to land upon said right side mounted photodetector when said beam is reflected from said right side and a limited amount of said light beam to land upon said left side mounted photodetector when said beam is reflected from said left side.

3. An angle position transducer as claimed in claim 1, additionally comprising:
   amplifier means connected to said right and left side mounted photodetector means to produce right and left output signals; and
   add and subtract circuit means for receiving said output signals and subtracting one output signal from the other to produce a useful angle output signal indicating the angle position of said light beam.

4. An angle position transducer, as claimed in claim 3, additionally comprising:
   add and add circuit means for receiving said output signals from said amplifier means and to produce a light beam grating information signal; and
   divider circuit means wherein said useful angle output signal and said light beam grating information signal are divided, one into the other, to eliminate variations in said signals due to changes in temperature and changes in the level of said light beam.

5. An angle position transducer, as claimed in claim 4, additionally comprising:
   low band pass filter means connected between said add and add circuit means and said divider circuit means and between said add and substract circuit means and said divider circuit means to filter out said light beam grating information signal from said divider means while passing said useful angle signal to said divider means.

6. An angle position transducer for indicating the position of a light beam as that beam rotates in a locus from left to right and right to left about a point and is reflected by a radial deflector back toward said point of rotation, comprising:

photodetector means for indicating the degree of angular position of said light beam at any point of said locus;

said photodetector means being mounted on the left and right sides of said point of rotation, a wedge shaped mask having a narrow point mounted between said left and right side mounted photodetector means and a wide end mounted between said point of rotation and said radial reflector;

a second mask having an aperture therein which receives said wide end of said wedge shaped mask, wherein said wedge shaped mask limits the amount of said light from said beam that lands upon said left side mounted photodetector when said beam is reflected from the right side of said radial reflector and limits the amount of said light from said beam that lands upon said right side mounted photodetector when said beam is reflected from the left side of said radial reflector, and wherein said second mask limits the amount of said light from said beam that lands upon said left side mounted photodetector when said beam is reflected from the extreme left side of said radial reflector and limits the amount of said light from said beam that lands upon said right side mounted photodetector when said beam is reflected from the extreme right side of said radial reflector;

circuit means connected to said left mounted photodetector and said right mounted photodetector to receive an output signal from each photodetector and to subtract one signal from the other thereby producing a useful angle position indicating signal;

circuit means connected to said left mounted photodetector and said right mounted photodetector to receive said output signals from each photodetector and to add said signals thereby producing a light beam grating information signal; and divider circuit means which receive said useful angle position indicating signal and said light beam grating information signal and divide one into the other to produce an angle indicating signal free from errors caused by temperature and intensity of said light beam.

* * * * *